United States Patent
Lof et al.

(10) Patent No.: US 9,737,935 B2
(45) Date of Patent: Aug. 22, 2017

(54) TURNING INSERT

(71) Applicant: SANDVIK INTELLECTUAL PROPERTY AB, Sandviken (SE)

(72) Inventors: Ronnie Lof, Sandviken (SE); Adam Johansson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/289,095

(22) Filed: Oct. 7, 2016

(65) Prior Publication Data

US 2017/0100778 A1  Apr. 13, 2017

(30) Foreign Application Priority Data

Oct. 9, 2015 (EP) ..................................... 15189175

(51) Int. Cl.
*B23C 5/20* (2006.01)
*B23B 27/16* (2006.01)

(52) U.S. Cl.
CPC .... *B23B 27/164* (2013.01); *B23B 2200/0452* (2013.01); *B23B 2200/081* (2013.01)

(58) Field of Classification Search
CPC .......... B23B 27/141; B23B 2200/0428; B23B 2200/0447; B23B 2200/0485; B23B 2200/201; B23B 2200/125; B23C 2200/203; B23C 2200/0411; B23C 2200/125; B23C 2200/201
See application file for complete search history.

(56) References Cited

U.S. PATENT DOCUMENTS

| | | | | |
|---|---|---|---|---|
| 3,314,126 | A * | 4/1967 | Stier | B23B 27/1622 407/105 |
| 3,777,341 | A * | 12/1973 | Faber | B23B 27/1614 407/101 |
| 4,065,223 | A | 12/1977 | Nelson | |
| 4,632,608 | A | 12/1986 | Blomberg et al. | |
| 5,634,745 | A * | 6/1997 | Wiman | B23B 27/141 407/113 |
| 5,779,400 | A * | 7/1998 | Fountaine | B23B 27/1614 407/103 |

(Continued)

FOREIGN PATENT DOCUMENTS

| | | |
|---|---|---|
| EP | 0699495 A1 | 3/1996 |
| EP | 1595625 A2 | 11/2005 |

(Continued)

*Primary Examiner* — Will Fridie, Jr.
(74) *Attorney, Agent, or Firm* — Corinne R. Gorski

(57) ABSTRACT

A turning insert includes a top surface, an opposite bottom surface, side surfaces connecting the top surface and the bottom surface and two opposite nose portions. Each nose portion includes a convex nose cutting edge, a first cutting edge and a second cutting edge. The convex nose cutting edge connects the first and second cutting edges. A bisector extends equidistantly from the first and second cutting edges. In a top view the first and second cutting edges on the same nose portion form a nose angle (α) of 70-85° relative to each other. Each nose portion includes a third convex cutting edge adjacent to the first cutting edge and a fourth cutting edge adjacent to the third cutting edge. In a top view the fourth cutting edge forms an angle (β) of 0-34° relative to the bisector.

16 Claims, 11 Drawing Sheets

(56) References Cited

U.S. PATENT DOCUMENTS

| | | | | |
|---|---|---|---|---|
| 6,217,263 | B1 * | 4/2001 | Wiman | B23B 27/141 |
| | | | | 407/114 |
| 6,835,028 | B2 * | 12/2004 | Usui | B23B 27/145 |
| | | | | 407/114 |
| 7,008,148 | B2 * | 3/2006 | Wiman | B23B 27/141 |
| | | | | 407/113 |
| 7,431,540 | B2 * | 10/2008 | Lof | B23B 27/141 |
| | | | | 407/103 |
| 7,544,023 | B2 * | 6/2009 | Lof | B23B 27/141 |
| | | | | 407/113 |
| 7,547,164 | B2 * | 6/2009 | Hessman | B23C 5/207 |
| | | | | 407/113 |
| 7,905,689 | B2 * | 3/2011 | Dufour | B23C 5/207 |
| | | | | 407/113 |
| 9,475,136 | B2 * | 10/2016 | Kovac | B23C 5/207 |
| 2013/0330136 | A1 * | 12/2013 | Hecht | B23C 5/2221 |
| | | | | 407/113 |

FOREIGN PATENT DOCUMENTS

| | | |
|---|---|---|
| JP | H06277901 A | 10/1994 |
| WO | 2014190363 A | 12/2014 |
| WO | 2015129836 A1 | 9/2015 |

* cited by examiner

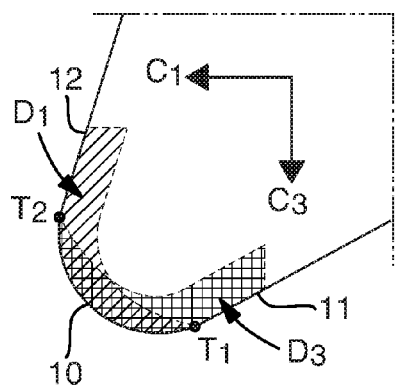
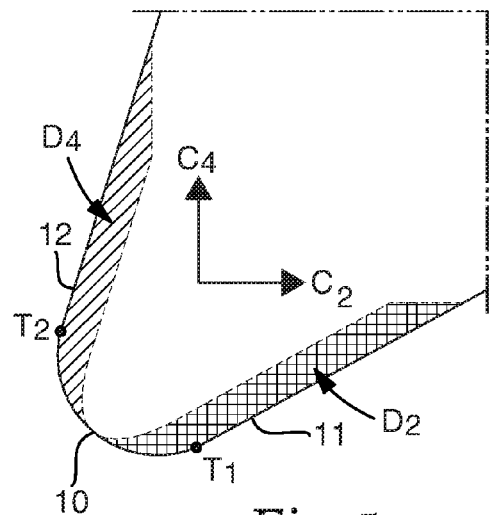
Fig 4    Fig 5
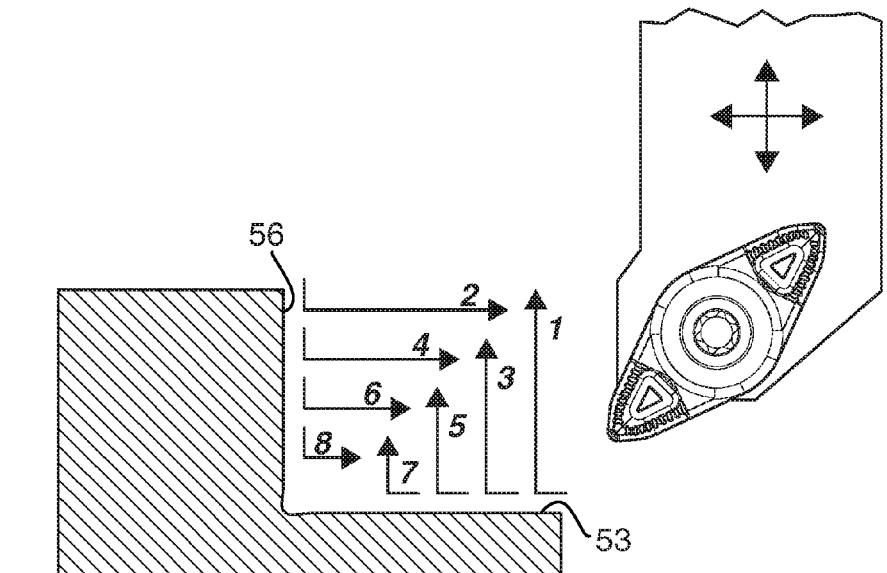
Fig 6

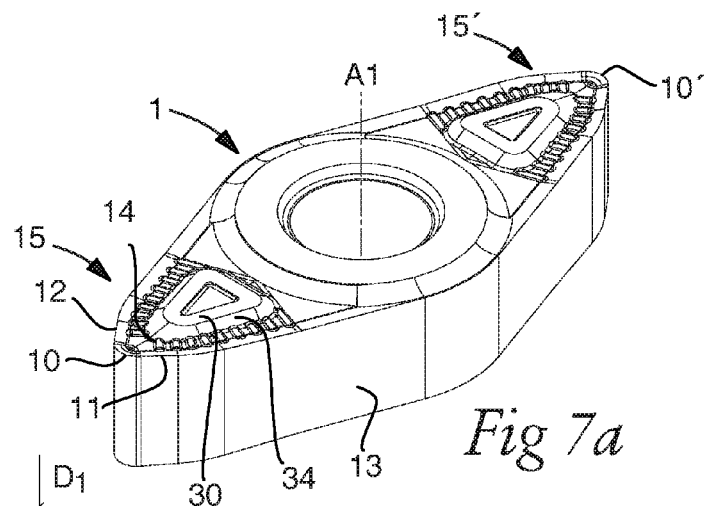
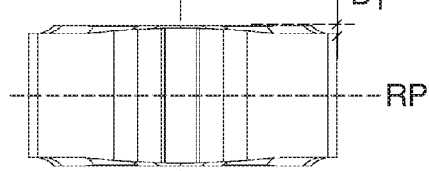
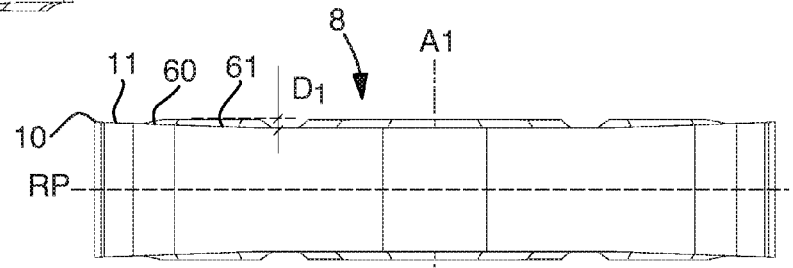
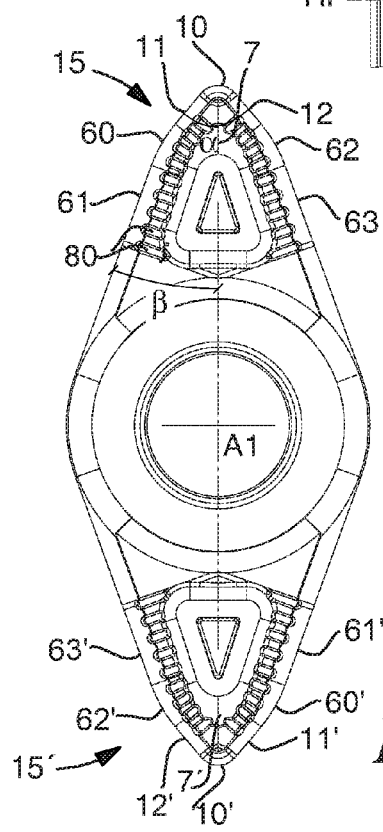
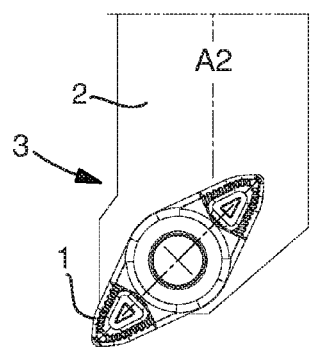
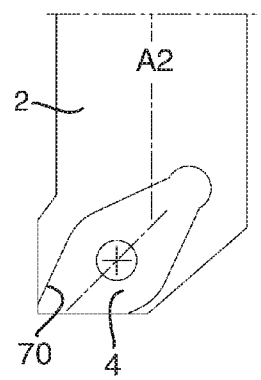

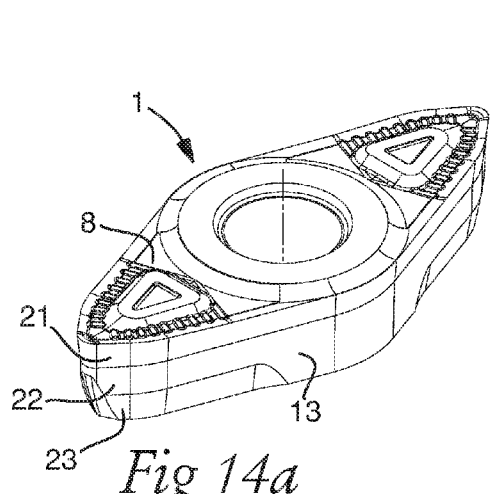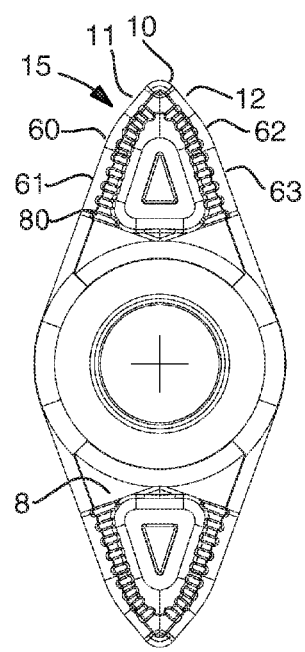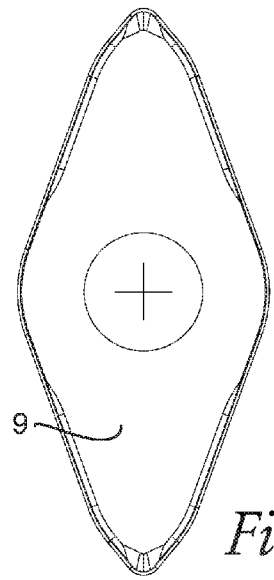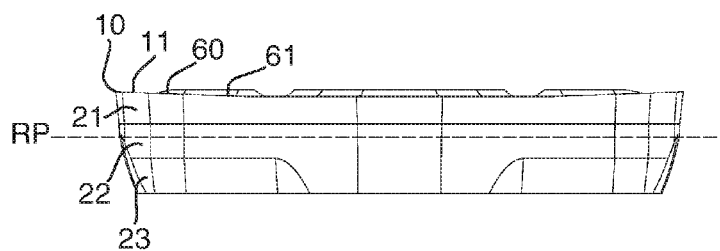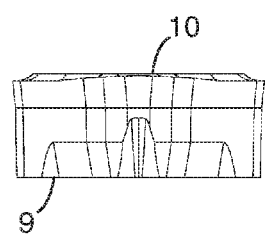
Fig 14a
Fig 14b
Fig 14c
Fig 14d
Fig 14e

TURNING INSERT

RELATED APPLICATION DATA

This application claims priority under 35 U.S.C. §119 to EP Patent Application No. 15189175.1, filed on Oct. 9, 2015, which the entirety thereof is incorporated herein by reference.

TECHNICAL FIELD

The present disclosure relates to the technical field of metal cutting. More specifically, the field of turning inserts used for metal cutting in machines such as CNC-machines.

BACKGROUND

A turning insert is disclosed in U.S. Pat. No. 4,632,608. In turning of a metal work piece, the metal work piece rotates around a center axis. The metal work piece is clamped at one end by a chuck or jaws or by other means, which means rotates. The end of the work piece which is clamped can be called a clamping end or a driving end. For stable clamping, the clamping end or the driving end of the metal work piece has a larger diameter than the opposite end of the metal work piece and/or has a larger diameter of a portion of the metal work piece located between the clamping end and the opposite end. Alternatively, the metal work piece has a constant diameter before a machining, i.e. metal cutting, operation.

The turning insert is moved in relation to the metal work piece. This relative movement is called feed. The movement of the turning insert can be in a direction parallel to the center axis of the metal work piece, this is commonly called longitudinal feed or axial feed. The movement of turning insert can furthermore be in a direction perpendicular to the center axis of the metal work piece, this is commonly called radial feed or facing. Other angles of movement are also possible, this is commonly known as copying or copy-turning.

During the relative movement of the turning insert, material from the metal work piece is removed in the form of chips. The chips are can be short and/or have a shape or direction of movement which prevents chip jamming and/or do not give a poor surface finish of the machined surface.

A common shape of turning insert which can be used for a wide range of feed direction is the rhombic turning insert. Such insert has in a top view, i.e. the rake face towards the viewer, the shape of a rhombus. The two corners of the rhombus which are located at the greatest distance from each other forms nose cutting edges, which typically has a radius of curvature in the range of 0.2-2.0 mm. These two corners may have a nose angle of 55°. Examples of such turning inserts are commonly designated DNMG and DCMT according to ISO standard, and are commonly made at least partly from cemented carbide or cubic boron nitride (CBN) or ceramic or cermet.

Commonly in radial turning, the feed direction is towards the rotational axis of the metal work piece. Although radial turning away from the rotational axis of the metal work piece, also known as out-facing, in theory is advantageous when machining certain components, if common turning inserts such as DNMG or DCMT where to be used, poor chip control and fast insert wear would occur.

The turning insert in U.S. Pat. No. 4,632,608 is intended to overcome drawbacks in out-facing. The inserts have triangular and rhombic shapes, where the rhombic shape inserts comprise four nose portions, where two opposite nose portions are located at acute angles of the rhombus, including a cutting edge in the shape of a circular arc of an angle which is at least 180°. A portion of the circular arc shaped cutting edge is the only active cutting edge in out-facing. The turning insert in U.S. Pat. No. 4,632,608 can be used for machining two walls forming an external 90° corner in a metal work piece, where one wall is perpendicular to the rotational axis and one cylindrical wall is parallel to the rotational axis, where the two walls are connected by a circular segment.

Commonly in axial turning when machining the wall surface of an external 90° corner in a metal work piece which is parallel to the rotational axis of the metal work piece, the feed direction is towards the wall surface which is perpendicular to the rotational axis of the metal work piece. Also the turning inserts in U.S. Pat. No. 4,632,608 is used in this way.

SUMMARY

To overcome the above disadvantages, the present disclosure is directed to a way of machining two wall surfaces forming an external 90° corner in a metal work piece that is more effective with regards to insert wear and/or chip breaking and/or chip control, and that a turning insert that provides further improvements compared to previously known turning inserts. More specifically, axial turning, i.e. feed parallel to the rotational axis of the metal work piece, away from the clamping end of the work piece and/or away from the external 90° corner gives reduced insert wear and improved chip breaking and/or chip control. When feeding away from the clamping end, the surface generating nose cutting edge is behind the active main cutting edge in the feed direction, which is opposite to conventional axial turning where the surface generating nose cutting edge is ahead of the active main cutting edge in the feed direction.

An aspect of the disclosure is to provide a turning insert including two nose portions, suitable for machining two wall surfaces forming an external 90° corner in a metal work piece, which has reduced insert wear and/or improved chip breaking and/or chip control in axial turning, i.e. feed parallel to the rotational axis of the metal work piece, away from the clamping end of the work piece and/or away from the external 90° corner.

A further aspect is to provide a turning insert which has a surface generating active nose cutting edge on an active nose portion, which can be used in both axial feed in opposite directions and radial feed in opposite directions, where the same active nose portion can be used for machining a 90° corner formed by two walls connected by a curved segment having the same radius of curvature as the nose cutting edge of the turning insert.

These aspects are achieved with the initially defined turning insert, wherein each nose portion includes a first cutting edge and a second cutting edge, the convex nose cutting edge connecting the first and second cutting edges, a bisector extending equidistantly from the first and second cutting edges, and in a top view the first and second cutting edges on the same nose portion forming a nose angle $\alpha$ of 70-85° relative to each other. Each nose portion includes a third convex cutting edge adjacent to the first cutting edge and a fourth cutting edge adjacent to the third convex cutting edge, in that in a top view the fourth cutting edge forms an angle $\beta$ of 0-34° relative to the bisector, and wherein the distance from the forth cutting edge to the reference plane is decreasing away from the nose cutting edge.

By such an insert, the insert wear is reduced and chip breaking and/or chip control is improved when axial feeding the turning insert away from the clamping end of the metal work piece and/or away from an external 90° corner formed by two wall surfaces. The relatively large nose angle gives reduced insert wear at the nose cutting edge. The nose angle is sufficiently small, less or equal than 85°, so that a 90° corner can be machined. The forth cutting edge is arranged such that it forms an angle of 0-34° in relation to the bisector.

The first and second cutting edges during machining of a an external 90° corner are arranged inside the sector which has the wall surfaces of the external 90° corner as borders. The first and second cutting edges are arranged such that they provide sufficient clearance, at least 3°, for example at least 8°, when feeding towards and perpendicular to the rotational axis of the metal work piece and when axial feeding towards the clamping end of the metal work piece. The fourth cutting edge is arranged to be the main cutting edge, i.e. removing the majority of the metal work piece material, when axial turning away from the clamping end and/or the 90° corner.

In such operation, the fourth cutting edge is arranged such that it forms an entering angle of 20-40°. That the distance from the fourth cutting edge to the reference plane decreases as the distance from the nose cutting edge increases gives the further effect of improving the chip control even further. The fourth cutting edge may form an angle relative to the reference plane of 3-5°.

The top surface includes a rake face. The bottom surface includes a seating surface. In other words, at least a portion of the bottom surface is arranged to be in contact with a seating surface of a tool body or a shim located in a seat of a tool body. The reference plane is parallel to a plane in which the nose cutting edges on the top surface are located. The reference plane is between the top and bottom surfaces in such a way that the distance from the reference plane to the top surface and bottom surface is equal. The top and bottom surfaces may be flat. The top surface is preferably not flat.

The nose cutting edges are located at equal distances from the center axis. The center axis passes through a geometrical center of the insert. The center axis may coincide with a center axis of a through hole having openings in the top and bottom surfaces. The nose cutting edges form the most distal portions of the turning insert, in other words, the nose cutting edges are the parts of the cutting insert which are located at the greatest distance from the center axis. A nose portion is a peripheral portion of the cutting insert where a rake face is formed on the top surface between the first, second and nose cutting edges.

The nose cutting edge has the shape of an arc or a portion of a circle having its center between the first and second cutting edge, wherein the circle, for example, has a radius of 0.2-2.0 mm. In other words, the nose cutting edge can be a convex cutting edge having a radius of curvature of 0.2-2.0 mm. The nose angel of 70-85° give the advantage that a 90° corner, i.e. two wall surfaces being perpendicular to each other, can be machined with one nose portion of the turning insert, without any reorientation of the turning insert. Alternatively, a nose angle of 70-85° is equal to a nose cutting edge having the shape of a circular arc of an angle of 70-85°.

The nose cutting edge may have a shape that deviates slightly from a perfect circular arc. A top view is a view in which the top surface is facing the viewer and the bottom surface is facing away from the viewer. The first and second cutting edges can be straight in a top view. If the first and second cutting edges are not straight, e.g. slightly convex, slightly concave or saw-tooth shaped, the angles are measured using straight lines between the end points of the first and second cutting edges respectively. The first and second cutting edges may have a length of 0.5-20.0 mm, for example, 1.0-3.0 mm.

The forth cutting edge slopes towards the bottom surface and the reference plane slopes away from the nose cutting edge in a side view. All nose cutting edges may be located in a common plane parallel to the reference plane. A cutting edge is an edge of the turning insert which borders to a rake face and a clearance surface. All parts of the turning insert are located inside a sector, which has the extensions of the first and second cutting edges as borders. This gives the advantage of machining the wall surfaces of 90° corner without reorientation of the turning insert. The two nose portions are opposite each other, i.e. each nose portion forms an angle of 180° around the center axis in relation to the other nose portion.

According to an embodiment, the turning insert further includes a fifth convex cutting edge adjacent to the second cutting edge and a sixth cutting edge adjacent to the fifth cutting edge, wherein the sixth cutting edge forms an angle of 0-34° relative to the bisector in a top view.

By such a turning insert, reduced risk of vibration and reduced risk of chip jamming in out-facing is achieved.

According to an embodiment, the first, second and fourth cutting edges are linear or straight in a top view. By such a turning insert, the cutting force direction and/or chip flow direction will be less dependent of the cutting depth, i.e. depth of cut. In this context, a concave or convex radius of curvature greater than 200 mm is considered straight or linear. If any of the first, second and fourth cutting edges have a radius of curvature greater than 200 mm, this radius of curvature is substantially greater, or more than 10 times greater, than the radius of curvature of the third cutting edge.

According to an embodiment, bisectors extend in a common direction such that each bisector intersecting the center axis A1, wherein each nose portion is symmetrical in relation to the bisector, wherein the turning insert is 180° symmetrical, and wherein angle β is 10-20°. By such a turning insert, it is possible to use the insert for metal work pieces clamped at opposite ends.

Each nose portion is thus symmetrical in relation to the bisector, i.e. each nose portion has a shape which is mirrored in a plane perpendicular to the reference plane and including the bisector. In other words, the half of the nose portion which is located on one side of the bisector is a mirror shape of the other half of the nose portion located on the opposite side of the bisector. The symmetry in this meaning is the shape and extension of the cutting edges and topography, e.g. chip breaker formation, of the top surface. The turning insert is 180° symmetrical, in other words, if the turning insert is rotated 180° around the center axis A1, the turning insert is identical. In other words, the two opposite nose portions are identical.

According to an embodiment, in a top view, the radius of curvature of the third cutting edge is greater than the radius of curvature of the nose cutting edge. By such a turning insert, the insert wear is reduced, especially the wear at the third cutting edge.

According to an embodiment, the distance from the first cutting edge to the reference plane RP decreases as the distance from the nose cutting edge increases. By such a turning insert, the chip control is further improved, especially at low depths of cut when axial turning such that the first cutting edge is active The distance from the first cutting edge to the reference plane decreases as the distance from the nose cutting edge increases, i.e. the distance from different points of the first cutting edge to the reference plane varies in such a way that that this distance decreases as the distance from the nose cutting edge increases. In other words, the first cutting edge slopes towards the reference plane in a side view and the nose cutting edge is located at a greater distance from the reference plane than at least a majority of the first cutting edge.

The first cutting edge may form an angle of 1-3° relative to the reference plane. According to an embodiment of the invention, the distance from the third cutting edge to the reference plane decreases as the distance from the nose cutting edge increases.

The third cutting edge forms an angle of 1-3° relative to the reference plane. By such a turning insert, the chip control is further improved. According to an embodiment, the top surface includes a protrusion having a first chip breaker wall facing the fourth cutting edge, in that the distance from the fourth cutting edge to the first chip breaker wall is increasing away from the nose cutting edge.

By such a turning insert, the chip control is further improved. For example, the risk of chip jamming or chips hitting the metal work piece is reduced. The protrusion extends further away from the reference plane than surrounding portions of the top surface. The protrusion may have an extension along the bisector. The protrusion can include a second chip breaker wall facing the sixth cutting edge.

The distance, from the fourth cutting edge to the first chip breaker wall, is measured in a direction perpendicular to the fourth cutting edge, and in a plane parallel to the reference plane, to the first chip breaker wall. The protrusion, and thus the first chip breaker wall, does not necessarily have to extend along the whole length of the fourth cutting edge.

According to an embodiment, a distance D1, measured in a plane perpendicular to the reference plane RP, between the top surface of the protrusion and the lowest point of the forth cutting edge is 0.28-0.35 mm. By such a turning insert, the chip breaking and/or chip control is further improved. One further effect is that there is a reduced risk that chips hit the machined surface, which can reduce the surface quality of the machined metal work piece, i.e. the component. Thus, the height difference in a side view between the top surface, i.e. highest point, of the protrusion and the lowest point of fourth cutting edge is 0.28-0.35 mm.

According to an embodiment, bumps are formed at the top surface, the bumps being located at a distance from the fourth cutting edge, and being located between the fourth cutting edge and the first chip breaker wall, the bumps having an major extension in a direction perpendicular or substantially perpendicular to the fourth cutting edge.

By such a turning insert, when the fourth cutting edge is active at an entering angle of 10-45°, the chip will be wide and thin, and have a bottom surface which includes elongated grooves as the result of the bumps. This makes the chip more stable and easier to break against the first chip breaker wall. The major extension of the bumps gives the effect that the time, until the wear of the bumps reduces the effect of the bumps on the chips, is increased.

The bumps, or protrusions, are portions of the top surface which extends away from the reference plane in relation to the surrounding area. In a top view, the bumps may have an oval or substantially oval shape. In a top view, the major extension is in a direction perpendicular or substantially perpendicular to the fourth cutting edge. The bumps are separated from each other. The bumps can be located at a constant distance from each other. The bumps may also be located at a constant distance or a substantially constant distance from the fourth cutting edge. For example, the bumps can be located a distance 0.3-0.6 mm from the fourth cutting edge.

The bumps may be are elongated protrusions, having a length perpendicular to the adjacent cutting edge in the range of 0.8-3.0 mm, and a width, which is smaller than the length, parallel to the adjacent cutting edge, in the range of 0.2-1.5 mm. Substantially perpendicular to the fourth cutting edge means within +/−20° from perpendicular to the fourth cutting edge.

According to an embodiment, bumps are formed at the top surface, at least one of the bumps being located perpendicular to and having a major extension in a direction perpendicular to the third cutting edge. At least one of the bumps is located perpendicular to and having an major extension in a direction perpendicular to the first cutting edge.

By such a turning insert, chip breaking and/or chip control is further improved, especially at lower depth of cut, i.e. when the depths of cut is such that the first cutting edge is active and that the fourth cutting edge is inactive. At such low depth of cut, the chip is very thin, due to the low entering angle by the first cutting edge, and the bumps function as chip breakers. The major extension of the bumps gives the effect that the time, until the wear of the bumps reduces the effect of the bumps on the chips, is increased.

The bumps, or protrusions, are portions of the top surface which extend away from the reference plane in relation to the surrounding area. In a top view, the bumps may have an oval or substantially oval shape. The bumps are separated from each other. The bumps may be located at a constant distance from each other.

According to an embodiment, the top and bottom surfaces are identical, and wherein the top and bottom surfaces includes seating surfaces located a greater distance from the reference plane RP than the distance from the reference plane RP to the cutting edges. By such a turning insert, the time in cut which sets the limit of usage for the turning insert can be increased.

The seating surfaces may provide the top surface of the protrusion.

According to an embodiment, a turning tool includes a turning insert and a tool body, the tool body including a front end, an opposite rear end, a main extension along a longitudinal axis A2 extending from the front end to the rear end, and an insert seat formed in the front end in which the turning insert is mountable such that in a top view the distance from the fourth cutting edge of an active nose portion to the longitudinal axis of the tool body is shorter than the distance from the second cutting edge of an active nose portion to the longitudinal axis A2 of the tool body, in that the fourth cutting edge of an active nose portion forms an angle of 45-80° in relation to longitudinal axis A2 of the tool body. In other words, the fourth cutting edge forms an entering angle κ1 of 10-45° when the turning tool is moving in a direction perpendicular to the longitudinal axis A2 of the tool body.

By such a turning tool, the performance is further improved when the turning tool is moving in a direction perpendicular to the longitudinal axis of the tool body and parallel to the rotational axis of the metal work piece away from the clamping end and/or the 90° corner, when the depth of cut is sufficiently great such that the fourth cutting edge is active. If the entering is less than 10°, the width of the chips would be too wide resulting in poor chip control, and the risk of vibration would increase. Also, less depth of cut is possible. If the entering angle is over 45°, the insert wear would increase.

The active nose portion is the nose portion, which in a mounted state includes the nose cutting edge, which in a top view is the part of the turning insert that is most distal in relation to the rear end of the tool body and in relation to the longitudinal axis of the tool body. The angle which the first cutting edge of the active nose portion forms in relation to the longitudinal axis of the tool body is greater than the angle which the second cutting edge of the active nose portion forms in relation to the longitudinal axis of the tool body.

The angle which the fourth cutting edge of the active nose portion forms in relation to the longitudinal axis of the tool body is greater than the angle which the sixth cutting edge of the active nose portion forms in relation to the longitudinal axis of the tool body.

The center axis of the turning insert in a mounted state is substantially perpendicular in relation to the longitudinal axis of the tool body. The insert seat of the tool body is an open cavity or a cut-out in which a turning insert is mountable. Example of means for mounting the insert includes a screw and a top-clamp. The rear end of the tool body is the part of the tool body that is located at a greatest distance from the active nose cutting edge.

According to an embodiment, the insert seat includes a side wall facing a clearance surface adjacent to the sixth cutting edge located at the active nose portion. When the turning insert is mounted in the seat, or at least during machining when the fourth cutting edge is active, the side wall of the insert seat which faces a clearance surface adjacent to the sixth cutting edge located at the active nose portion is in contact with said clearance surface.

According to an embodiment, a method to machine a metal work piece is performed using a turning tool including a turning insert according to the invention. The method includes the steps of rotating the metal work piece around a rotational axis A3, positioning the first cutting edge of an active nose portion such that the first cutting edge forms a smaller angle relative to the rotational axis A3 of the metal work piece than the angle formed by the second cutting edge relative to the rotational axis A3 of the metal work piece, moving the turning insert in a direction parallel to the rotational axis A3 such that the first cutting edge is active and is ahead of the surface generating nose cutting edge in the direction of movement of the turning insert, and such that the fourth cutting edge is active at a first entering angle κ1 of 10-45°.

A cylindrical surface is a surface which has an extension along the rotational axis of the metal work piece and is located at a constant distance from the rotational axis of the metal work piece. Constant distance means a wavy surface where the wave height is less than 0.10 mm.

An active nose portion is the nose portion which is positioned such that during cutting, this nose portion includes at least one cutting edge which cuts chips from the metal work piece. The active nose portion is positioned closer to the rotational axis of the metal work piece and closer to the first end of the metal work piece than the opposite and inactive nose portion.

The fourth cutting edge being active means that the fourth cutting edge cuts chips from the metal work piece. The first cutting edge is active. Further, a portion of the nose cutting edge adjacent to the active first cutting edge is active. The second cutting edge, formed on the same nose portion as the first cutting edge, is inactive simultaneously as the first cutting edge is active. The moving of the turning insert is commonly known as feeding, in this case axial feed. The axial feed can be in a direction away from the clamping end of the metal work piece.

According to an embodiment of the invention, a method to machine a metal work piece is performed using a turning tool including a turning insert according to the invention. The method includes the steps of clamping the metal work piece at a first end, rotating the metal work piece around a rotational axis A3, positioning the longitudinal axis A2 of the tool body perpendicular to the rotational axis A3 of the metal work piece, positioning the first cutting edge of an active nose portion such that the first cutting edge forms a smaller angle relative to the rotational axis A3 of the metal work piece than the angle formed by the second cutting edge of an active nose portion relative to the rotational axis of the metal work piece, positioning the first cutting edge of an active nose portion a shorter distance from the longitudinal axis A2 of the tool body than the distance from the second cutting edge of an active nose portion to the longitudinal axis A2 of the tool body, positioning the nose cutting edge closer to the rotational axis A3 of the metal work piece and a greater distance from the longitudinal axis A2 of the tool body than all other parts of the turning insert, moving the turning insert in a direction parallel to the rotational axis A3 such that the first cutting edge is active and is ahead of the surface generating nose cutting edge in the direction of movement of the turning insert, and such that the fourth cutting edge is active at a first entering angle κ1 of 10-45°.

An active nose portion is the nose portion which is positioned such that during cutting, this nose portion includes at least one cutting edge which cuts chips from the metal work piece. The second cutting edge, formed on the same nose portion as the first cutting edge, is inactive simultaneously as the first cutting edge is active. The moving of the turning insert is commonly known as feeding, in this case axial feed or longitudinal feed.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 4 is a schematic top view a nose portion of a conventional turning insert, showing wear from conventional turning.

FIG. 5 is a schematic top view of a nose portion of an embodiment, showing wear from turning in FIG. 6.

FIG. 6 is a schematic view showing turning of a 90° corner by a turning insert according to a first embodiment FIG. 7a is a perspective view showing a turning insert according to a first embodiment.

FIG. 7b is a front view of the turning insert in FIG. 7a.

FIG. 7c is a side of the turning insert in FIG. 7a.

FIG. 7d is a top view of the turning insert in FIG. 7a.

FIG. 7e is a top view of the turning insert in FIG. 7a and a tool body.

FIG. 7f is a top view of the tool body in FIG. 7e.

FIG. 11b is a top view of the turning insert in FIG. 11a.

FIG. 11c is a bottom view of the turning insert in FIG. 11a.

FIG. 11d is a side view of the turning insert in FIG. 11a.

FIG. 11e is a front top view of the turning insert in FIG. 11a.

FIG. 12b is a top view of the turning insert in FIG. 12a.

FIG. 12c is a bottom view of the turning insert in FIG. 12a.

FIG. 12d is a side view of the turning insert in FIG. 12a.

FIG. 12e is a front top view of the turning insert in FIG. 12a.

FIG. 13b is a top view of the turning insert in FIG. 13a.

FIG. 13c is a bottom view of the turning insert in FIG. 13a.

FIG. 13d is a side view of the turning insert in FIG. 13a.

FIG. 13e is a front top view of the turning insert in FIG. 13a.

FIG. 14a is a perspective view showing a turning insert according to a fifth embodiment.

FIG. 14b is a top view of the turning insert in FIG. 14a.

FIG. 14c is a bottom view of the turning insert in FIG. 14a.

FIG. 14d is a side view of the turning insert in FIG. 14a.

FIG. 14e is a front top view of the turning insert in FIG. 14a.

FIG. 15b is a top view of the turning insert in FIG. 15a.

FIG. 15c is a bottom view of the turning insert in FIG. 15a.

FIG. 15d is a side view of the turning insert in FIG. 15a.

FIG. 15e is a front top view of the turning insert in FIG. 15a.

All turning insert figures have been drawn to scale.

DETAILED DESCRIPTION

Figure 1:
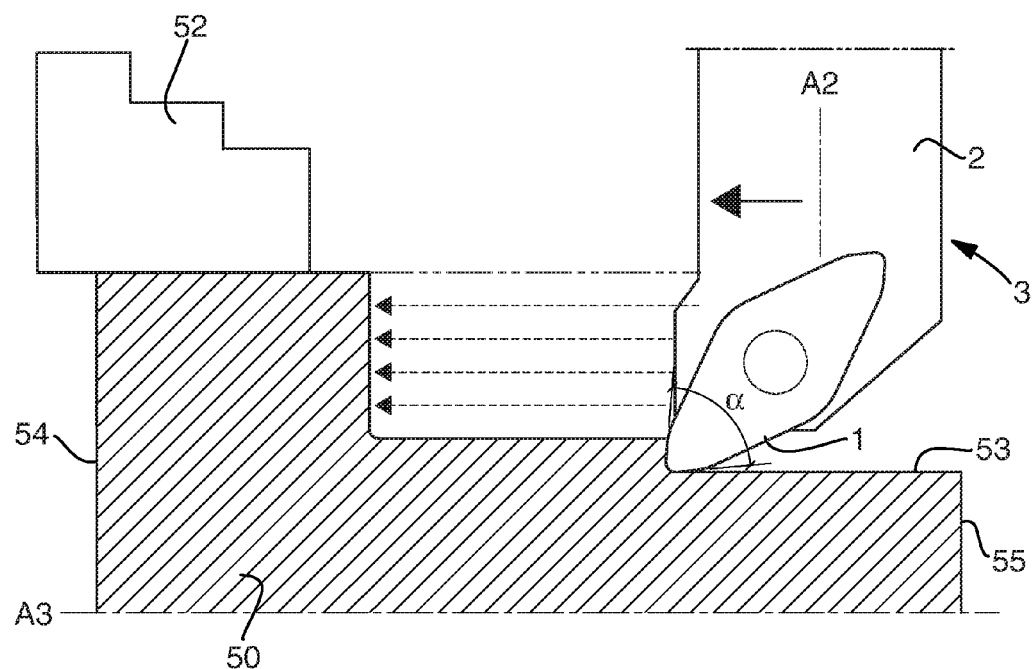
FIG. 1 is a schematic view showing conventional turning of a cylindrical surface by a turning insert according to a first embodiment.

Reference is made to FIG. 1, which show a conventional metal cutting operation by turning using a turning insert 1 according to an embodiment. A metal work piece 50 is clamped by clamping jaws 52, which are connected to a machine including a motor not shown, such as a CNC-machine or a turning lathe. The clamping jaws press against an external surface at a first end 54, or clamping end, of the metal work piece 50. An opposite second end 55 of the metal work piece 50 is a free end. The metal work piece 50 rotates around a rotational axis A3. The turning insert 1 is securely and removably clamped in an insert seat or a pocket in a a tool body 2. The tool body 2 has a longitudinal axis A2, extending from a rear end to a front end, in which the insert seat or pocket is located. The tool body 2 and the turning insert 1 together form a turning tool 3. The turning tool 3 is moved in relation to the metal work piece 50, commonly designated feed.

In FIG. 1, the feed is axial, also called longitudinal feed, i.e. the direction of the feed is parallel to the rotational axis A3. In this way, a cylindrical surface 53 is formed. The turning insert 1 has an active nose with a nose angle α which is 80°. As the turning insert 1 reaches closer to the wall surface which is perpendicular to the rotational axis A3, chip control is poor because there is not much space for the chips to get out from the cutting zone. There is also risk that chips hits or damages the machined surface. The main cutting edge is behind the nose cutting edge, in other words, the entering angle is over 90°, in FIG. 1 around 95°.

Figure 2:
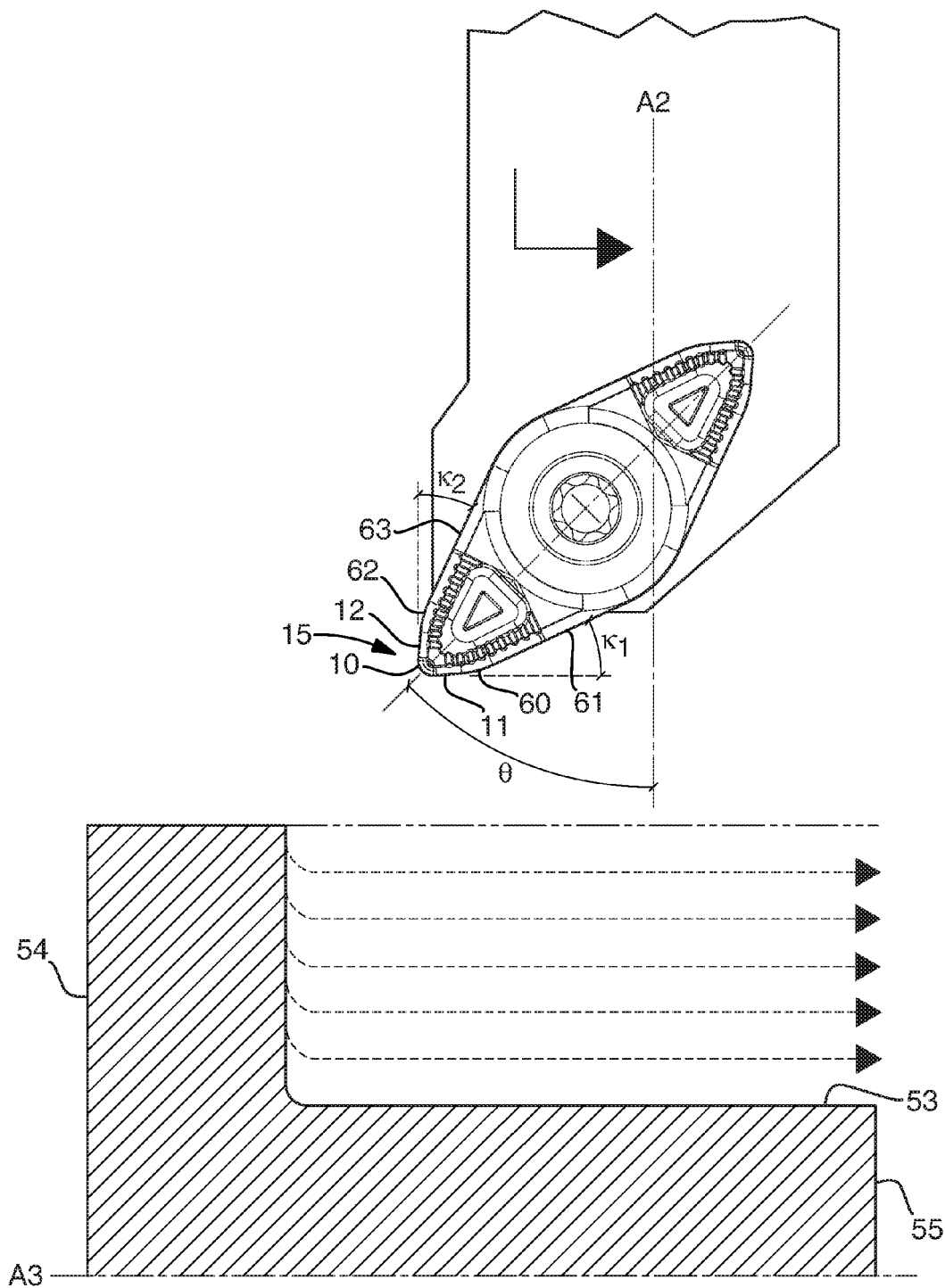
FIG. 2 is a schematic view showing turning of a cylindrical surface by a turning insert according to a first embodiment.

Reference is made to FIG. 2, which shows turning using a turning insert according to a first embodiment. As in FIG. 1, a metal work piece is clamped by clamping jaws not shown, which are pressed against an external surface at a first end 54, or clamping end, of the metal work piece. An opposite second end 55 of the metal work piece is a free end. The metal work piece rotates around a rotational axis A3. The turning insert, seen in top view, is securely and removably clamped in an insert seat or a pocket in tool body 2 by means of a screw. The tool body 2 has a longitudinal axis A2, extending from a rear end to a front end, in which the insert seat or pocket is located.

In FIG. 2, the feed is, to a greatest extent, axial, also called longitudinal feed, i.e. the direction of the feed is parallel to the rotational axis A3. In this way, an external cylindrical surface 53 is formed. At the entry of each cut, or immediately prior to the axial feed, the feed has a radial component, in such a way that the turning insert move along an arc of a circle.

The turning insert includes two opposite and identical nose portions 15, 15' formed 180° relative each other around a center axis of the turning insert 1. Each nose portion 15, 15' includes a first cutting edge 11, a second cutting edge 12 and a convex nose cutting edge 10 connecting the first 11 and second 12 cutting edges. One nose portion 15, located closer to the rotational axis A3 than the opposite inactive nose portion 15', is active. Active means that the nose portion as placed such that it can be used for cutting chips from the metal work piece 50.

A bisector 7 extending equidistantly from the first 11 and second 12 cutting edges, intersecting the center of the nose cutting edge 10 and a center axis A1 of the turning insert. The first and second cutting edges 11, 12 converge at a point not shown outside the turning insert. The bisector of the active nose portion 15 forms an angle θ, 40-50°, relative to the longitudinal axis A2.

In a top view the first 11 and second 12 cutting edges on the same nose portion 15 forms a nose angle α of 70-85° relative to each other, which in FIG. 2 is 80°. A third convex cutting edge 60 is formed adjacent to the first cutting edge 11. A fourth cutting edge 61 is formed adjacent to the third cutting edge 60, further away from the nose cutting edge 10. A fifth convex cutting edge 62 is formed adjacent to the second cutting edge 12. A sixth cutting edge 63 is formed adjacent to the fifth cutting edge 62, further away from the nose cutting edge 10.

In the top view, as in FIG. 2, the first, second, fourth and sixth cutting edges 11, 12, 61, 63 are linear or straight, or substantially linear or straight. The main feed direction, towards the right in FIG. 2, is parallel to the rotational axis A3 and away from the first end 54, or clamping end, of the metal work piece 50. In the feed direction, the fourth cutting edge 61 is active at an entering angle κ1 of 10-45°, for example, 20-40°, which in FIG. 2 is 30°. The fourth cutting edge 63 is the main cutting edge in the feed direction, i.e. the majority of the chips are cut by the fourth cutting edge 63, at least at moderate to high depth of cut. To a lesser degree, third cutting edge 60, the first cutting edge 11 and the nose cutting edge 10 are also active. The first cutting edge is ahead of the nose cutting edge 10 in the axial feed direction. All parts of the turning insert is ahead of the active nose cutting edge 10 in the feed direction. The second cutting edge 11, formed on the active nose portion 15, is inactive.

In the axial turning operation, chips can be directed away from the metal work piece in a trouble-free manner, especially compared to the machining shown in FIG. 1 where the feed is towards the clamping end and towards a wall surface. In the machining step in FIG. 2, the turning insert 1 enters into the metal work piece 50 such that the nose cutting edge 10 moves along an arc of a circle. The turning insert 1 enters into the metal work piece 50, or goes into cut, such that the chip thickness during entry is constant or substantially constant. At the entry, the depth of cut is increased from zero depth of cut. Such preferred entry reduces the insert wear, especially the wear at the nose cutting edge 10.

Chip thickness is defined as feed rate multiplied by entering angle. Thus, by choosing and/or varying the feed rate and the movement and/or direction of the turning insert during entry, the chip thickness can be constant or substantially constant. The feed rate during entry is for example, less or equal than 0.50 mm/revolution. The chip thickness during entry can be less than or equal to the chip thickness during subsequent cutting or machining.

If the feed direction would be radial, in such a way that the feed direction would be perpendicular to and away from the rotational axis A3, the sixth cutting edge 63 would be active at an entering angle κ2 of 10-45°, for example, 20-40°.

The cylindrical surface 53, or rational symmetrical surface, generated or formed at least partly by the nose cutting edge in FIGS. 1 and 2, has a wavy shape with small peaks and valleys, and the wavy shape is influenced at least partly by the curvature of the nose radius and the feed rate. The wave height is less than 0.10 mm, for example, less than 0.05 mm. A thread profile is not a cylindrical surface 53 in this sense.

Figure 3:
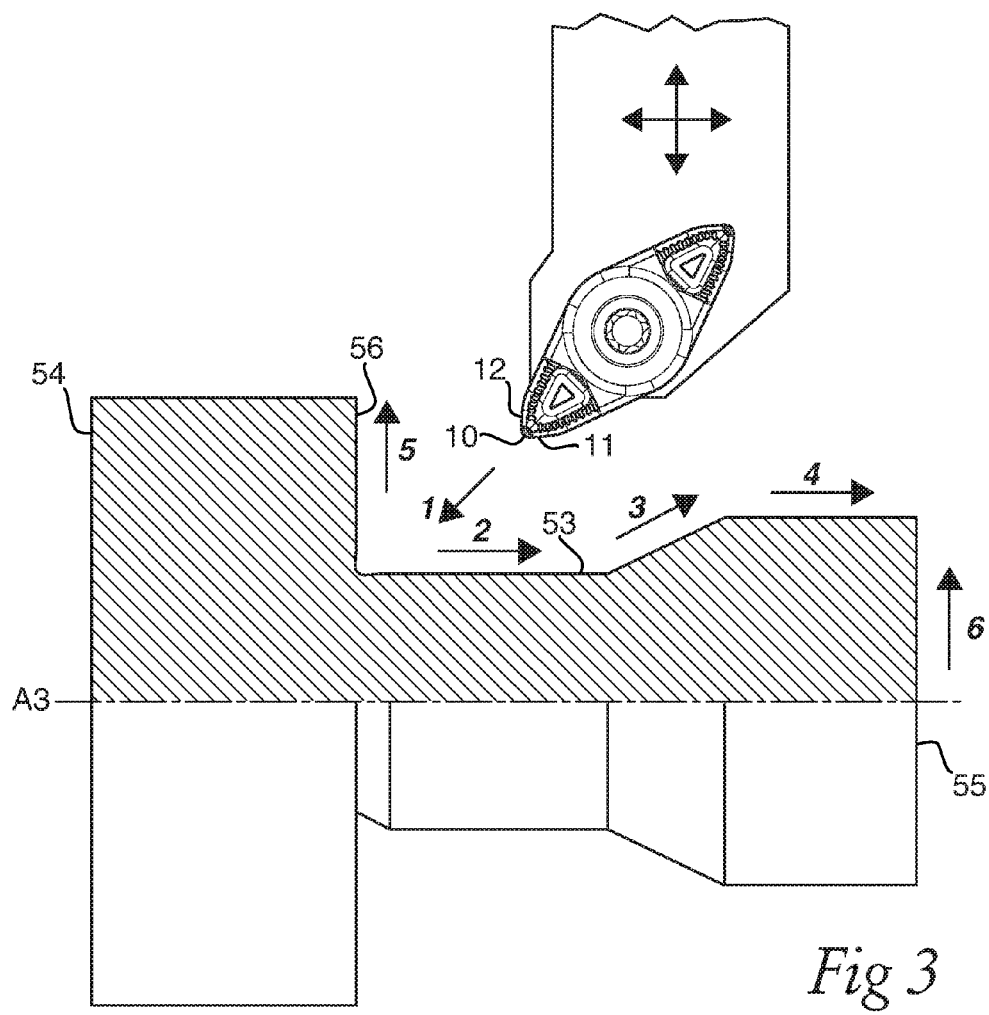
FIG. 3 is a schematic view showing turning, including axial turning and out-facing, of a metal work piece by a turning insert according to a first embodiment.

In FIG. 3, the turning insert and tool body in FIG. 2 can be seen in alternative machining operations, showing the versatile application area of the turning tool, especially with regard to feed direction. A machining sequence in six steps is shown. Step 1 is a undercutting operation, Step 2 is axial turning away from the first end 54, or clamping end, of the metal work piece. Step 3 is a profiling operation in the form of a feed which has both an axial and a radial component, generating a conical or frustoconical surface. Step 4 is an operation similar to step 2. Step 5 is an out-facing operation generation a flat surface located in a plane perpendicular to the rotational axis A3 of the metal work piece. Step 6 is an out-facing operation at the second end 55, or free end, of the metal work piece.

FIG. 4 shows the principle of conventional turning, where C1 represents the feed direction in FIG. 1, and D1 represents the wear on a nose portion from such operation. C3 represents a conventional facing operation, i.e. feed perpendicular and towards the rotational axis A3, and D3 represents the wear on a nose portion from such operation. The second cutting edge 12 is an active cutting edge in C1 feed direction. The first cutting edge 11 is an active cutting edge in C3 feed direction. A convex nose cutting edge 10 connects the first and second cutting edges 11, 12.

Transition points T1, T2 represent the transition between the nose cutting edge 10 and the first 11 and second 12 cutting edge, respectively. The wear D1, D3, is dependent on both the depth of cut and the feed rate. However, it is clear that D1 and D3 overlap, resulting in high wear at the nose cutting edge 10, or at least at a center portion of the nose cutting edge 10.

FIG. 5 shows the principle of an alternative turning method. C2 represents the main feed direction in FIG. 2, or the main feed direction in pass 2, 4, 6 and 8 in FIG. 6, i.e. an axial feed direction away from the clamping end of the metal work piece. D2 represents the wear on a nose portion from such operation. C4 represents an out-facing operation, i.e. feed perpendicular to and away from the rotational axis A3, as seen in the main feed directions in pass 1, 3, 5 and 7 in FIG. 6. D4 represents the wear on a nose portion from such operation. The second cutting edge 12 is an active cutting edge in C4 feed direction. The first cutting edge 11 is an active cutting edge in C2 feed direction. A convex nose cutting edge 10 connects the first and second cutting edges 11, 12.

Transition points T1, T2 represent the transition between the nose cutting edge 10 and the first 11 and second 12 cutting edge, respectively. The wear D2, D4, is dependent on both the depth of cut and the feed rate. However, it is clear that D2 and D4 do not overlap, or at least overlap to a lesser degree than in FIG. 4, resulting reduced wear at the nose cutting edge 10, or at least reduced wear at a center portion of the nose cutting edge 10. The wear of the first and second cutting edges 11, 12 is at a wider range compared to FIG. 11. However, because the smaller entering angles in feed C2 and C4 compared to the greater entering angles in C1 and C3, the chip thickness in FIG. 5 will be thinner and therefor give relatively small wear. At constant feed rate and depth of cut, the area of D2 is equal to the area of D3, and the area of D1 is equal to the area of D4.

Figure 10:
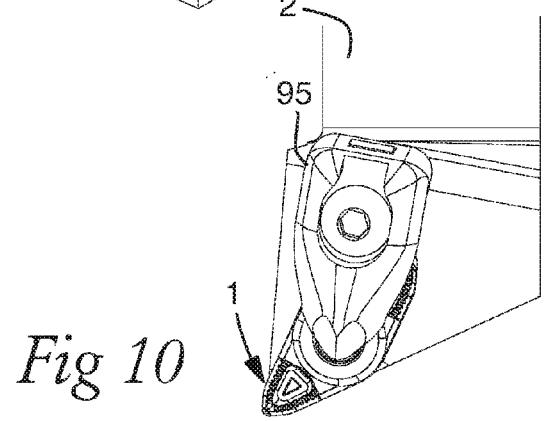
FIG. 10 is a top view showing the turning insert and the tool body in FIG. 8.
Figure 11A:
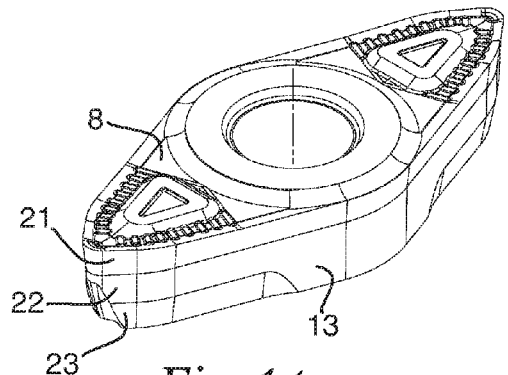
FIG. 11a is a perspective view showing a turning insert according to a second embodiment.
Figure 11B:
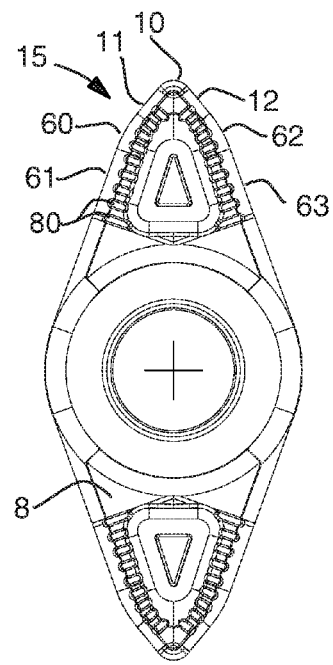
Figure 11C:
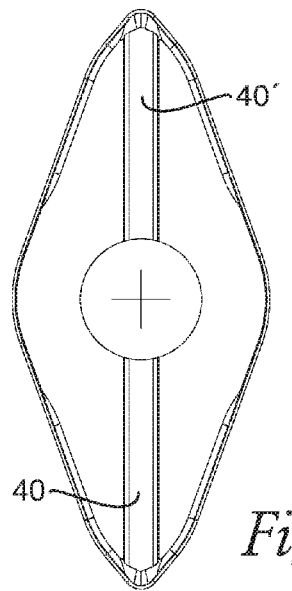
Figure 11D:
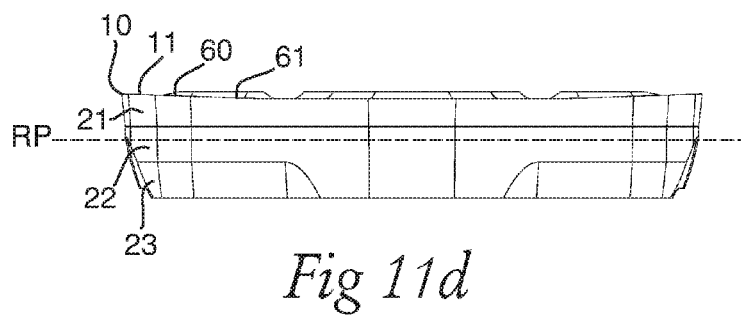
Figure 11E:
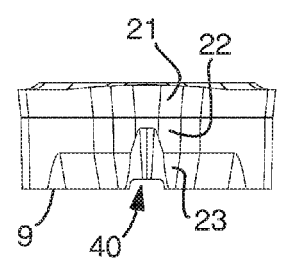
Figure 12A:
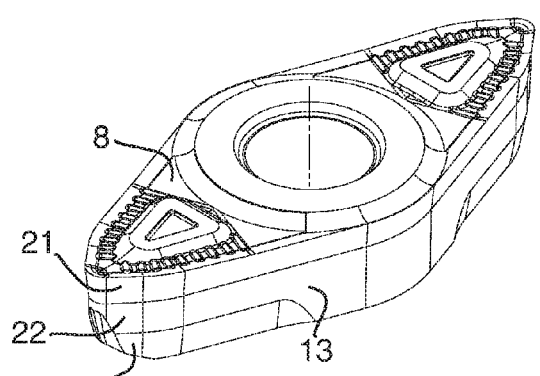
FIG. 12a is a perspective view showing a turning insert according to a third embodiment.
Figure 12B:
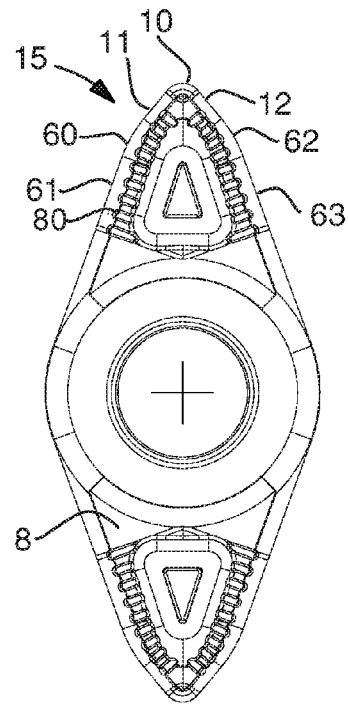
Figure 12C:
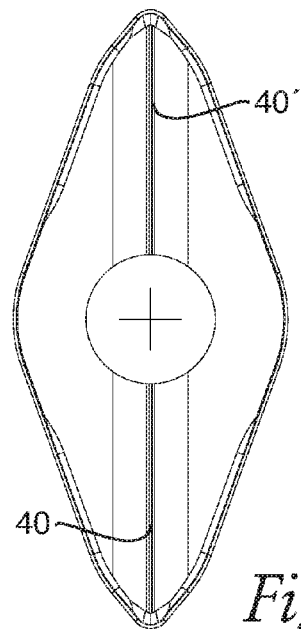
Figure 12D:
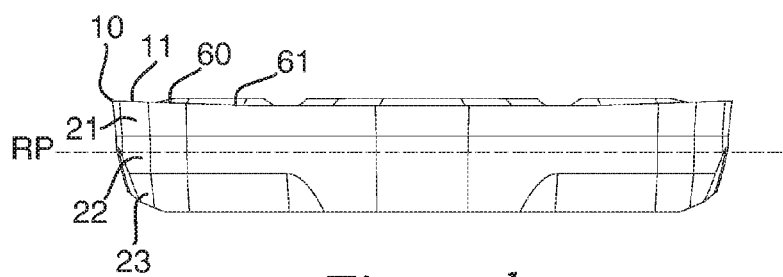
Figure 12E:
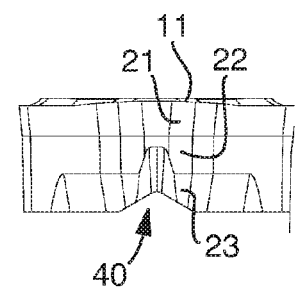
Figure 13A:
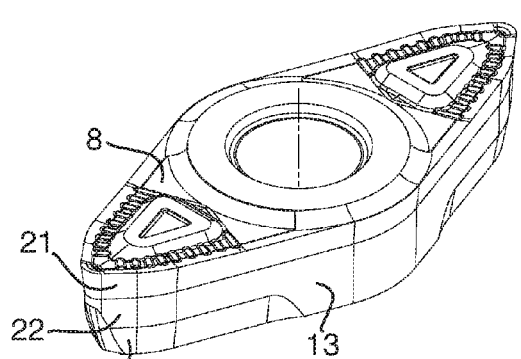
FIG. 13a is a perspective view showing a turning insert according to a fourth embodiment.
Figure 13B:
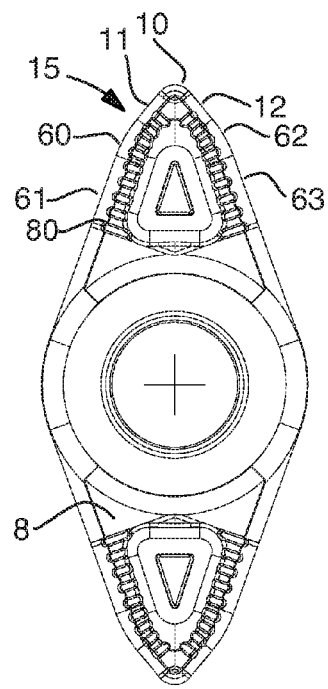
Figure 13C:
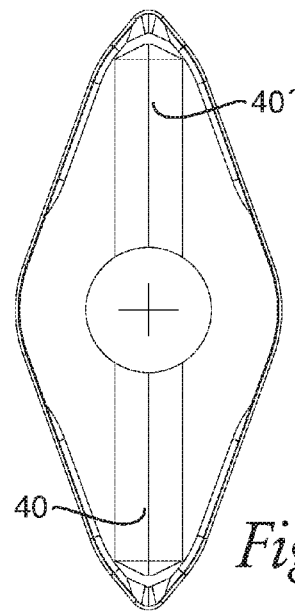
Figure 13D:
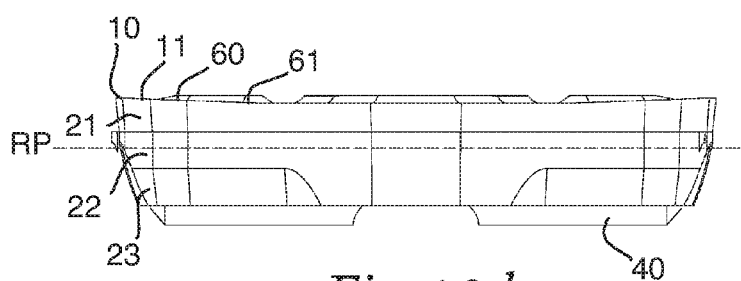
Figure 13E:
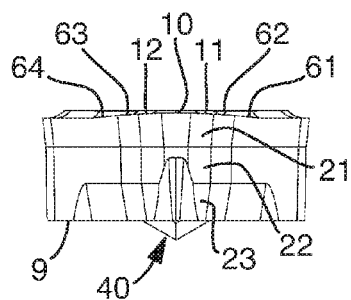
Figure 15A:
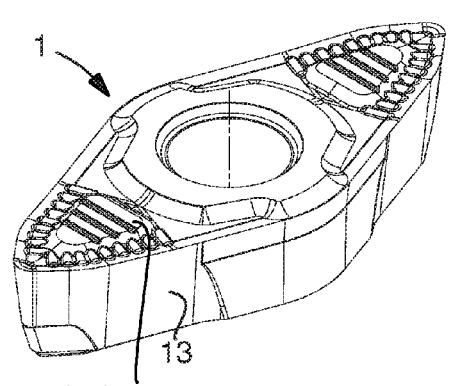
FIG. 15a is a perspective view showing a turning insert according to a sixth embodiment.
Figure 15B:
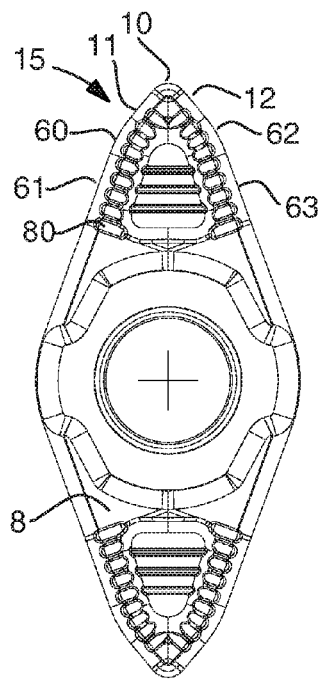
Figure 15C:
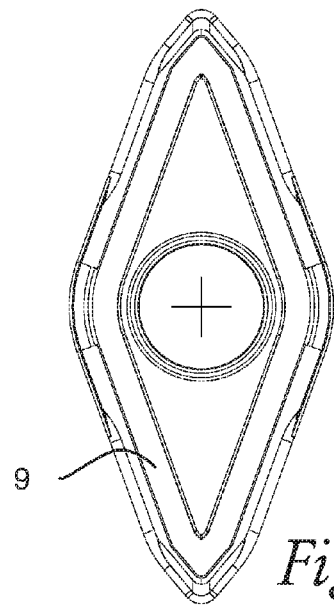
Figure 15D:
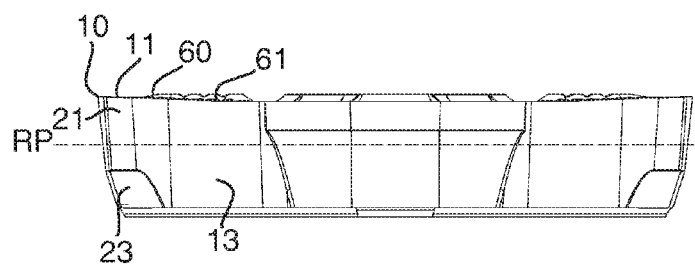
Figure 15E:
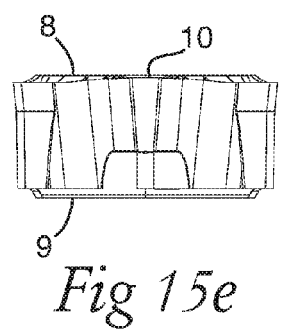

FIG. 6 shows an example of a machining sequence using a turning insert according to a first embodiment. The left-hand side is the clamping end of the metal work piece. A 90° corner including a cylindrical surface 53 and a flat surface 56 is formed by turning. A sequence of steps 1-8 is shown. The entry for each step is shown as perpendicular to the main feed direction of each step. The main feed direction in steps 1, 3, 5 and 7 is perpendicular to and away from the rotational axis A3. The main feed direction in steps 2, 4, 6 and 8 is parallel to the rotational axis A3 and away from the clamping end. The entry for each cut is described in connection to FIG. 2. The wear of the turning insert 1 after the sequence of steps showed in FIG. 10 is similar or identical to the wear showed in FIG. 5.

FIGS. 7a-f and FIGS. 8-10 further describe the turning insert 1 according to the first embodiment, as well as a turning tool 3 which includes the turning insert 1 and a tool body 2. The turning insert 1 includes a top surface 8, which is or includes a rake face 14, and an opposite bottom surface 9, functioning as a seating surface. A reference plane RP is located parallel to and between the top surface 8 and the bottom surface 9. A center axis A1 extends perpendicular to the reference plane RP and intersects the reference plane RP, the top surface 8 and the bottom surface 9. A screw hole having openings in the top surface 8 and the bottom surface 9 is concentric with the center axis A1.

The turning insert 1 includes side surfaces 13, functioning as clearance surfaces, connecting the top surface 8 and the bottom surface 9. Two opposite nose portions 15, 15' are formed symmetrically relative to or around the center axis A1. The nose portions 15, 15' are identical. Each nose portion 15, 15' includes a first cutting edge 11, a second cutting edge 12 and a convex nose cutting edge 10 connecting the first 11 and second 12 cutting edges. Each nose portion 15, 15' further includes a third convex cutting edge 60, formed adjacent to the first cutting edge 11, and a fourth cutting edge 61 formed adjacent to the third cutting edge 60, further away from the nose cutting edge 10. Each nose portion 15, 15' further includes a fifth convex cutting edge 62 formed adjacent to the second cutting edge 12, and a sixth cutting edge 63 formed adjacent to the fifth cutting edge 62, further away from the nose cutting edge 10. In top view, as in FIG. 7d, the first, second, fourth and sixth cutting edges 11, 12, 61, 63 are linear or straight, or substantially linear or straight.

The nose cutting edges 10, 10' are located at a largest distance from the center axis A1, i.e. at a larger distance from the center axis A1 than all other parts of the turning insert. In a top view, seen in FIG. 7d, the first 11 and second 12 cutting edges on the same nose portion 15 forms a nose angle α of 75-85° relative to each other, in FIG. 7d the nose angle α is 80°. In a side view, such as in FIG. 7c, at least a portion of the fourth and sixth cutting edges 61, 63 on each nose portion 15, 15', 15" slopes towards the bottom surface 9, such that in a side view, the fourth and sixth cutting edges 61, 63 has the highest points thereof closer to the nose cutting edge 10 on the same nose portion 15. In other words, the distance from the fourth cutting edge 61 and the sixth cutting edge 63 to the reference plane RP varies in such a way that that as this distance is decreasing the distance from the nose cutting edge 10 is increasing.

Further, the first, second third and fifth cutting edges 11, 12, 60, 62 are sloping towards the bottom surface 9 in a corresponding manner, such that in relation to the bottom surface 9, the nose cutting edge 10 is further away than the first and second cutting edges 11, 12, which in turn are further away than the third and fifth cutting edges 60, 62, which in turn are further away than the fourth and sixth cutting edges 61, 63.

Bisectors 7, 7' extend equidistantly from each pair of first 11, 11' and second 12, 12' cutting edges. Each bisector 7, 7' intersects the center axis A1, and the bisectors 7, 7' extend in a common direction. The bottom surface 9 is identical to the top surface 8. In a top view, as in FIG. 7d, the fourth cutting edge 61 forms an angle β of 0-34° relative to the bisector 7, which in FIG. 7d is 10-20°.

The top surface 8 includes protrusions 30 including a first chip breaker wall 34 facing the fourth cutting edge 61. The distance from the fourth cutting edge 61 to the first chip breaker wall 34 is increasing away from the nose cutting edge 10. The protrusions 30 are intended to function as seating surfaces, and the top surface of each protrusion is flat and parallel to the reference plane RP. The protrusions 30 are the part of the turning insert 1 which are located at the greatest distance from the reference plane RP. The protrusion includes a second chip breaker wall facing the sixth cutting edge. The distance, from the fourth cutting edge 61 to the first chip breaker wall 34, is measured in a direction perpendicular to the fourth cutting edge 61, and in a plane parallel to the reference plane RP, to the first chip breaker wall 34. The protrusion 30, and thus the first chip breaker wall 34, does not necessarily have to extend along the whole length of the fourth cutting edge 61. Still, the distance from the fourth cutting edge 61 to the first chip breaker wall 34 is increasing at the portion of the fourth cutting edge 61 where perpendicular to this fourth cutting edge 61, the first chip breaker wall 34 extends.

A distance D1 measured in a plane perpendicular to the reference plane RP between the top surface of the protrusion 30 and the lowest point of the fourth cutting edge 61 is 0.28-0.35 mm. Bumps 80, or protrusions, are formed in the top surface 8. The bumps 80 are located at a distance, greater than 0.3 mm and less than 3.0 mm, from the fourth cutting edge 61. The bumps 80 are located between the fourth cutting edge 61 and the first chip breaker wall 34. The bumps 80 have a non-circular shape in top view, such that a major extension, which is 0.8-3.0 mm, of the bumps is in a direction substantially perpendicular to or perpendicular to the fourth cutting edge 61. The minor extension of the bumps perpendicular to the major extension is 0.5-2.0 mm. The bumps 80, or protrusions, are portions of the top surface 8 which extends away from the reference plane in relation to the surrounding area. In a top view as in FIG. 7d, the bumps 80 may have an oval or substantially oval shape. The bumps 80 are separated from each other. The bumps 80 may be located at a constant distance from each other. The bumps 80 also can be located at a constant distance from the fourth cutting edge 61. In the first embodiment, there are 5 bumps adjacent to the fourth cutting edge. It is preferred to have 2-10 bumps adjacent to the fourth cutting edge.

There is at least one further bump 80, in the first embodiment 2-3 bumps, located perpendicular to and having an major extension in a direction perpendicular to the third cutting edge 60, and at least one further bump 80, in the first embodiment 1-2 bumps 80, located perpendicular to and having an major extension in a direction perpendicular to the first cutting edge 11. The turning insert 1 according to the first embodiment is mirror imaged/symmetrical on opposite sides of the bisectors 7, 7'. Therefore, bumps 80 are formed in a corresponding manner at a distance from the second, fifth and sixth cutting edges 12, 62, 63. By such a turning insert 1, chip breaking and/or chip control is further improved, especially at lower depth of cut, i.e. when the depths of cut is such that the first cutting edge 11 is active and that the fourth cutting edge 61 is inactive. At such low depth of cut, the chip is very thin, due to the low entering angle by the first cutting edge 11, and the bump or bumps 80, closest to the first cutting edge 11, function as chip breakers. The major extension of the bumps 80 gives the effect that the time, until the wear of the bumps 80 reduces the effect of the bumps 80 on the chips, is increased.

Reference is now made to FIGS. 2 and 7e-10, which show a turning tool 3 including a turning insert 1 according to the first embodiment and a tool body 2. The tool body 2 includes a front end, an opposite rear end, and has a main extension along a longitudinal axis A2 extending from the front end 44 to the rear end. An insert seat 4 is formed in the front end 44 in which the turning insert 1 is mountable. The tool body 4 is a square shank, which in cross section has a width of 25 mm and a height of 25 mm. The longitudinal axis is located at the center of such cross section. The tool body could alternatively has a different shape, e.g. a shape including a conical or frostoconical rear part suitable to be clamped in a tool spindle in a CNC-machine. In such case, the longitudinal axis A2 is located at the center of such cone.

Figure 8:
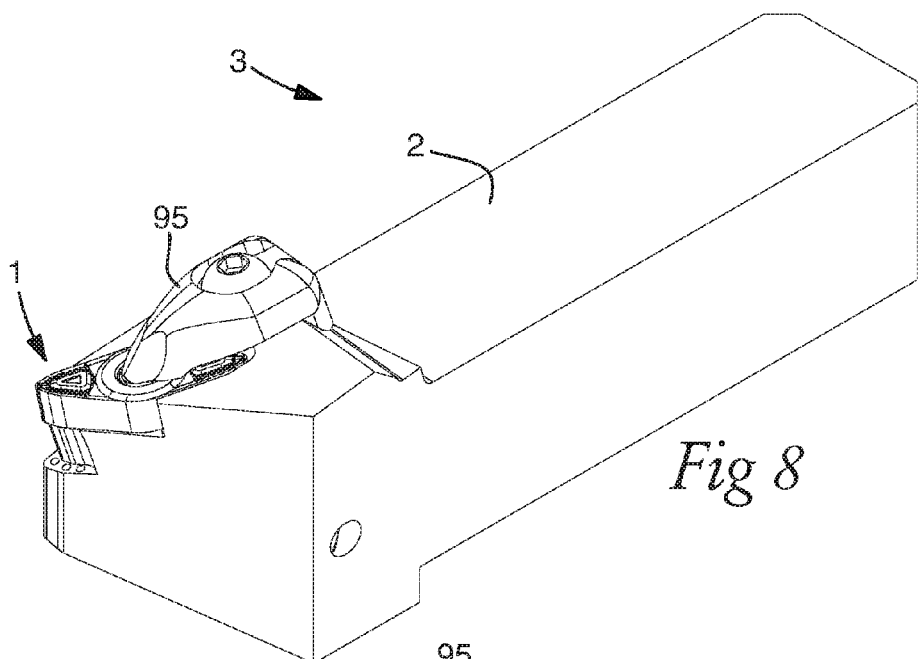
FIG. 8 is a perspective view showing the turning insert in FIG. 7a seated in a tool body.
Figure 9:
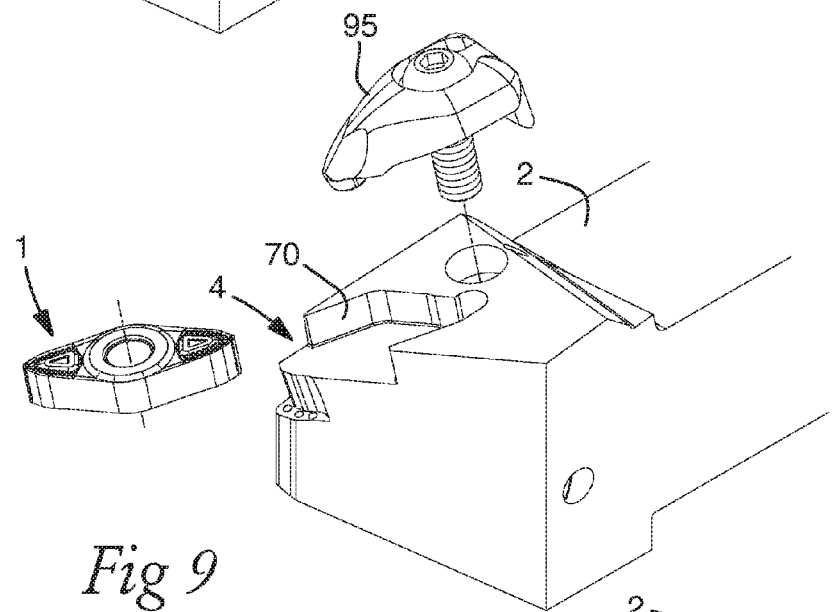
FIG. 9 is a perspective view showing the turning insert in FIG. 7a and a tool body.

The bisector of the active nose portion 15 forms an angle θ, 40-50°, relative to the longitudinal axis A2. The distance from the fourth cutting edge 61 of an active nose portion 15 to the longitudinal axis A2 of the tool body is shorter than the distance from the second cutting edge 12 of the same active nose portion 15 to the longitudinal axis A2 of the tool body. In an axial turning operation, i.e. when the turning tool is moving in a direction parallel to the rotational axis A3, where the fourth cutting edge 61 is active at an entering angle κ1 of 10-45°, as seen in FIG. 2, the cutting forces has a tendency to cause the turning insert to rotate in a clockwise direction around the center axis A1 thereof, seen in a top view as in FIG. 2. In order to reduce this risk, the insert seat 4 includes a side wall 70, seen clearly in FIGS. 7f and 9, facing a clearance surface 13 adjacent to the sixth cutting edge 63 located at the active nose portion. When the turning insert 1 is mounted in the insert seat 4 of the tool body 2, the side wall 70 is in contact with the clearance surface 13 adjacent to the sixth cutting edge 63 located at the active nose portion. The turning insert 1 is securely clamped or located in the insert seat 4 by clamping means, such as a clamp 95, as seen in FIGS. 8-10. Other clamping means are possible, such as a clamping screw extending through a central through hole in the turning insert 1.

The turning insert 1 according to the first embodiment is double sided, or usable in an upside-down position, in such a way that the top and bottom surface 8, 9 are identical. The area of the top and bottom surfaces 8, 9 are equal in size.

Reference is now made to FIGS. 11-14a-e, which shows a turning inserts according second, third, fourth and fifth embodiment, respectively. These embodiments differ from the first embodiment only with regards to the bottom surface and the side surfaces.

Thus, the turning insert 1 according to the second, third, fourth and fifth embodiment, shown in FIGS. 11-14a-e respectively, have the same or identical shape, form, dimension, value and interrelations between features and elements as the first embodiment with regards to the top surface 8, reference plane RP, screw hole, first cutting edge 11, nose cutting edge 10, second cutting edge 12, third cutting edge 60, fourth cutting edge 61, fifth cutting edge 62, sixth cutting edge 63, nose angle α, bisector 7, angle β, rake face 14, protrusion 30, first chip breaker wall 34, second chip breaker wall, distance D1 and bumps 80.

The turning inserts according to a second, third, fourth and fifth embodiment, respectively, as seen in FIGS. 11-14a-e, are formed such that a first side surface 13 includes a first clearance surface 21 adjacent to the first cutting edge 11, a third clearance surface 23, and a second clearance surface 22 located between the first clearance surface 21 and the third clearance surface 23.

The angle which the second clearance surface 22 forms in relation to the bottom surface 9 measured in a plane perpendicular to the first cutting edge 11 is greater than the angle which the third clearance surface 23 forms in relation to the bottom surface measured in a plane perpendicular to the first cutting edge 11.

The angle which the second clearance surface 22 forms in relation to the bottom surface 9 measured in a plane perpendicular to the first cutting edge 11 is greater than the angle which the first clearance surface 21 forms in relation to the bottom surface measured in a plane perpendicular to the first cutting edge 11.

The side surfaces 13, 13' of each nose portion 15, 15' are configured symmetrically in relation to a plane perpendicular to the reference plane RP and including the bisector 7. The clearance surface adjacent to the second cutting edge 12 is formed or arranged in a corresponding manner.

The advantages from the clearance surface arrangements are that out-facing can be performed at small metal work piece diameters, and that larger depth of cut is possible in out-facing.

Reference is now made to FIGS. 11a-e, which show a turning insert 1 according to a second embodiment. The bottom surface 9 includes rotation prevention means 40, in order to reduce movement of the turning insert 1 relative to the insert seat 4 during machining. The rotation prevention means 40 are in the form of two grooves 40, 40' having a common major extension, which major extension is corresponding to the extension of the bisectors 7, 7'.

Reference is now made to FIGS. 12a-e, which show a turning insert 1 according to a third embodiment. The bottom surface 9 includes rotation prevention means 40, in order to reduce movement of the turning insert 1 relative to the insert seat 4 during machining. The rotation prevention means 40 are in the form of two grooves 40, 40' having a common major extension, which major extension is corresponding to the extension of the bisectors 7, 7'. Each groove 40, 40' includes two surfaces which are form an obtuse angle, in the range of 100-160°, in relation to each other.

Reference is now made to FIGS. 13a-e, which show a turning insert 1 according to a fourth embodiment. The bottom surface 9 includes rotation prevention means 40, in order to reduce movement of the turning insert 1 relative to the insert seat 4 during machining. The rotation prevention means 40 are in the form of two ridges 40, 40' having a common major extension, which major extension is corresponding to the extension of the bisectors 7, 7'.

Reference is now made to FIGS. 14a-e, which show a turning insert 1 according to a fifth embodiment. The bottom surface 9 includes a flat surface 9, which is parallel to the reference plane RP.

Reference is now made to FIGS. 15a-e, which show a turning insert 1 according to a sixth embodiment. The bottom surface 9 includes a flat surface 9, which is parallel to the reference plane RP. The flat surface 9 is ring-shaped around the center axis of the turning insert.

A first side surface 13 includes a first clearance surface 21 adjacent to the first cutting edge 11 and a third clearance surface 23. The third clearance surface 23 borders to the bottom surface 9.

The angle which the first clearance surface 21 forms in relation to the bottom surface 9 measured in a plane perpendicular to the first cutting edge 11 is greater than the angle which the third clearance surface 23 forms in relation to the bottom surface measured in a plane perpendicular to the first cutting edge 11.

The clearance surface adjacent to the second cutting edge 12 is formed or arranged in a corresponding manner. The advantages from the clearance surface arrangements are that out-facing can be performed at small metal work piece diameters, and that larger depth of cut is possible in out-facing.

The protrusion 30 includes grooves formed in the top surface of the protrusion 30. The grooves have a major extension perpendicular to the bisector 7.

For all embodiments, the nose angle α, which is the angle between the first and second cutting edges 11, 12, is 75-85°, the angle β is 10-20°, and the radius of curvature in a top view of the nose cutting edge 10 is smaller than the radius of curvature of the third cutting edge. The transitions between all cutting edges are smooth, without sharp corners. By having a relatively large nose angle α, the strength of the nose cutting edge 10 is increased resulting in less wear. By having a relatively large nose angle α, the entering angle for the first cutting edge 11 is relatively small, 2.5-7.5°, which gives reduced wear of the first cutting edge. By having a relatively small radius of curvature of the nose cutting edge 10, a small radius on the component can be machined, and the turning insert 1 can be used to machine a wider range of shapes. By having an angle β of 10-20°, the entering angle of the first cutting edge 11, the vibration tendency is reduced at higher cutting depths, where the first cutting edge 11 is active.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A turning insert comprising:
   a top surface;
   an opposite bottom surface;
   side surfaces connecting the top surface and the bottom surface;
   two opposite nose portions, each nose portion including a convex nose cutting edge;
   a reference plane located parallel to and between the top surface and the bottom surface;
   a center axis extending perpendicular to the reference plane, each nose portion having a first cutting edge and a second cutting edge, the convex nose cutting edge connecting the first and second cutting edges; and
   a bisector extending equidistantly from the first and second cutting edges, the first and second cutting edges on the same nose portion forming a nose angle of 70-85° relative to each other, each nose portion including a third convex cutting edge adjacent to the first cutting edge and a fourth cutting edge adjacent to the third convex cutting edge, wherein the fourth cutting edge forms an angle of 0-34° relative to the bisector, a distance from the forth cutting edge to the reference plane decreasing away from the nose cutting edge.

2. A turning insert according to claim 1, wherein the turning insert includes a fifth convex cutting edge adjacent to the second cutting edge and a sixth cutting edge adjacent to the fifth cutting edge, wherein the sixth cutting edge forms an angle of 0-34° relative to the bisector.

3. A turning insert according to claim 1, wherein the first, second and fourth cutting edges are linear or straight.

4. A turning insert according to claim 1, wherein bisectors extend in a common direction such that each bisector intersects the center axis, wherein each nose portion is symmetrical in relation to the bisector, wherein the turning insert is 180° symmetrical, and wherein the angle between the fourth cutting edge and the bisector is 10-20°.

5. A turning insert according to claim 1, wherein the radius of curvature of the third cutting edge is greater than the radius of curvature of the nose cutting edge.

6. A turning insert according to claim 1, wherein the distance from the first cutting edge to the reference plane decreases as a distance from the nose cutting edge increases.

7. A turning insert according to claim 1, wherein the distance from the third cutting edge to the reference plane decreases as a distance from the nose cutting edge increases.

8. A turning insert according to claim 1, wherein the top surface includes a protrusion having a first chip breaker wall facing the forth cutting edge, and wherein the distance from the fourth cutting edge to the first chip breaker wall is increasing away from the nose cutting edge (10).

9. A turning insert according to claim 1, wherein a distance measured in a plane perpendicular to the reference plane, between the top surface of the protrusion and the lowest point of the forth cutting edge is 0.28-0.35 mm.

10. A turning insert according to claim 8, wherein bumps are formed at the top surface, the bumps being located at a distance from the fourth cutting edge, the bumps being located between the fourth cutting edge and the first chip breaker wall, the bumps having a major extension in a direction perpendicular or substantially perpendicular to the fourth cutting edge.

11. A turning insert according to claim 1, wherein bumps are formed at the top surface, at least one of the bumps being located perpendicular to and having a major extension in a direction perpendicular to the third cutting edge, at least one of the bumps being located perpendicular to and having an major extension in a direction perpendicular to the first cutting edge.

12. A turning insert according to claim 1, wherein the top and bottom surfaces are identical, and wherein the top and bottom surfaces comprises includes seating surfaces located a greater distance from the reference plane than the distance from the reference plane to the cutting edges.

13. A turning insert according to claim 1 and a tool body, the tool body comprising a front end, an opposite rear end, a main extension along a longitudinal axis extending from the front end to the rear end, an insert seat formed in the front end in which the turning insert is mountable such that in a top view the distance from the forth cutting edge of an active nose portion to the longitudinal axis the tool body is shorter than the distance from the second cutting edge of an active nose portion to the longitudinal axis of the tool body, the forth cutting edge of an active nose portion forming an angle of 45-80° in relation to longitudinal axis of the tool body.

14. The turning tool according to claim 12, wherein the insert seat includes a side wall facing a clearance surface adjacent to the sixth cutting edge located at the active nose portion.

15. A method to generate a cylindrical surface on a metal work piece with a turning insert or a turning tool according to claim 13, comprising the steps of:
   rotating the metal work piece around a rotational axis;
   positioning the first cutting edge of an active nose portion such that the first cutting edge forms a smaller angle relative to the rotational axis of the metal work piece than the angle formed by the second cutting edge relative to the rotational axis of the metal work piece; and
   moving the turning insert in a direction parallel to the rotational axis such that the first cutting edge is active and ahead of the surface generating nose cutting edge in the direction of movement of the turning insert, and such that the forth cutting edge is active at a first entering angle of 10-45°.

16. A method to machine a metal work piece with a turning tool according to claim 13, comprising the steps of:
   clamping the metal work piece at a first end;
   rotating the metal work piece around a rotational axis;
   positioning the longitudinal axis of the tool body perpendicular to the rotational axis of the metal work piece;
   positioning the first cutting edge of an active nose portion such that the first cutting edge forms a smaller angle relative to the rotational axis of the metal work piece than the angle formed by the second cutting edge of an active nose portion relative to the rotational axis of the metal work piece;
   positioning the first cutting edge of an active nose portion a shorter distance from the longitudinal axis of the tool body than the distance from the second cutting edge of an active nose portion to the longitudinal axis of the tool body;
   positioning the nose cutting edge closer to the rotational axis of the metal work piece and at a greater distance from the longitudinal axis of the tool body than all other parts of the turning insert; and moving the turning insert in a direction parallel to the rotational axis such that the first cutting edge is active and is ahead of the surface generating nose cutting edge in the direction of movement of the turning insert, and such that the forth cutting edge is active at a first entering angle of 10-45°.

* * * * *